Aug. 11, 1936.　　　　E. B. FOOTE　　　　2,050,753
TIME SCHEDULE CONTROL SYSTEM
Filed May 25, 1935　　2 Sheets-Sheet 1
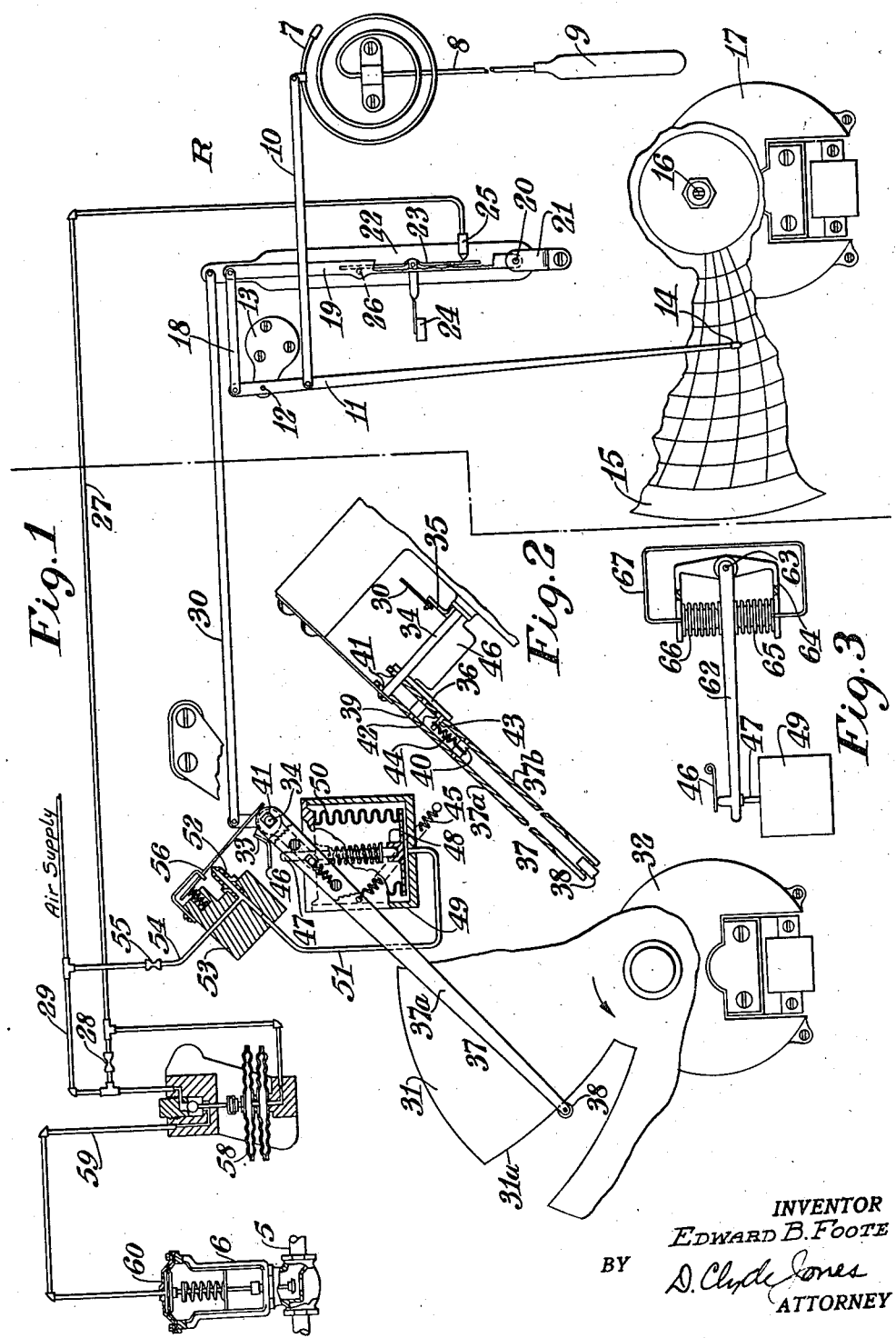
INVENTOR
EDWARD B. FOOTE
BY D. Clyde Jones
ATTORNEY

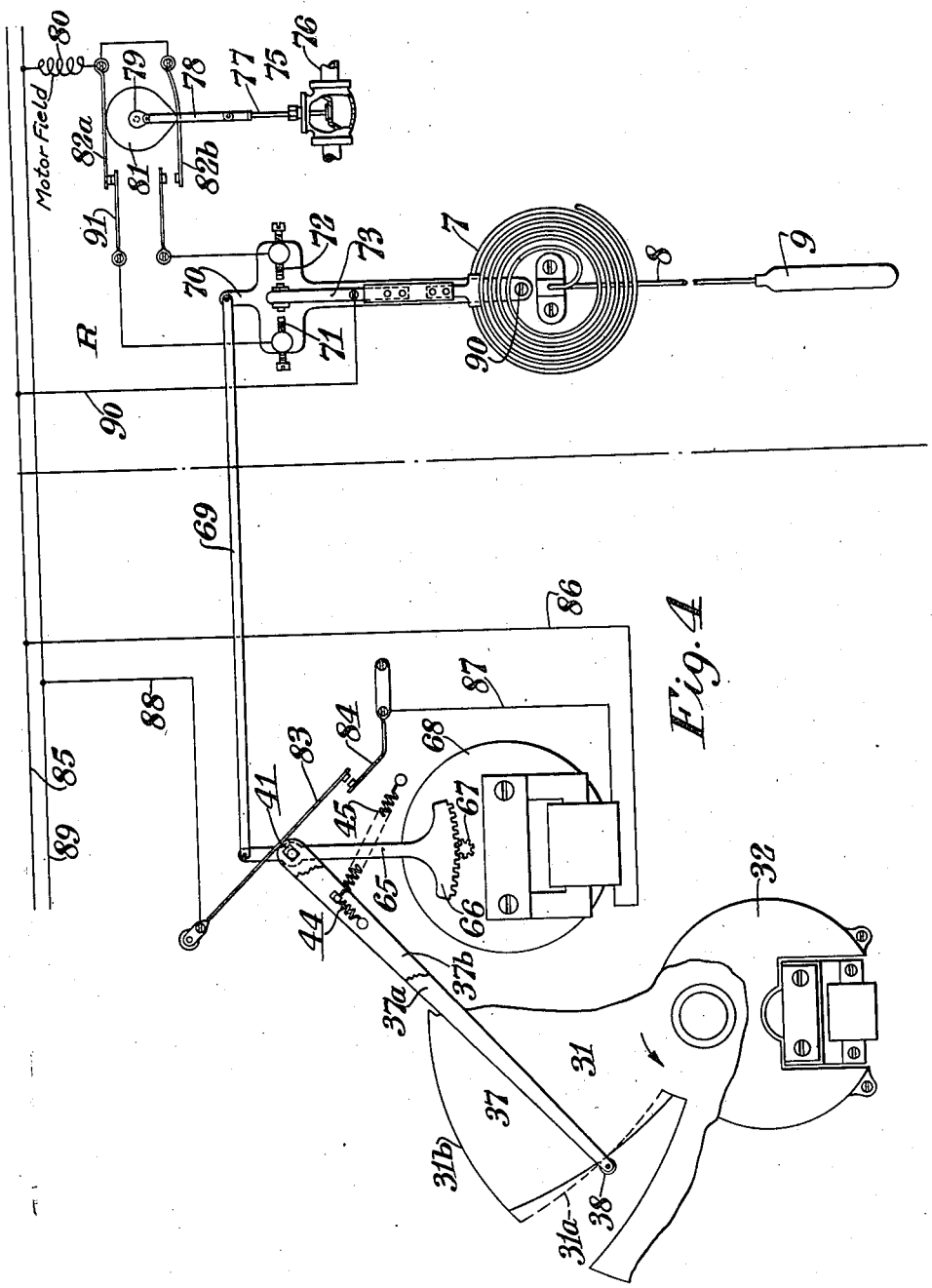

Patented Aug. 11, 1936

2,050,753

UNITED STATES PATENT OFFICE 2,050,753

TIME SCHEDULE CONTROL SYSTEM

Edward B. Foote, Rochester, N. Y., assignor to Taylor Instrument Companies, Rochester, N. Y., a corporation of New York Application May 25, 1935, Serial No. 23,529

9 Claims. (Cl. 236—46)

This invention relates to a time schedule control system and a time cycle device for use in such a system whereby a variable condition such as temperature, pressure or the like is controlled according to a predetermined schedule.

It has been customary in such time cycle devices to employ a clock-operated cam and cam follower to selectively adjust the setting of a controlling instrument whereby a predetermined schedule of temperature, pressure or the like is maintained thereby. In such former devices the minimum interval in which a given change in condition could be effective has been limited by the fact that if the cam surface were too abrupt, the cam follower instead of riding up this abrupt surface, would bind and the control system would be entirely ineffective. It has therefore been required that the cam surface be limited to such a contour that the cam follower would not bind thereon.

In accordance with the present invention, a novel arrangement is provided whereby a timing cam with any necessary degree of abruptness can be employed without danger of the cam follower arm binding. This result is attained by reason of the fact that a supplementary source of power other than the clock or other mechanism for moving the cam, is utilized in certain instances to rotate the follower arm, the application of this supplementary power being effected as a result of a radial movement of the follower arm with respect to its pivot. Thus on any tendency of the follower arm to bind due to the abruptness of the cam surface, the supplementary source of power rotates the follower arm by a series of small increments of radial movement until the predetermined change in condition has been effected.

The various features and advantages of the invention will appear from the detailed description and claims when taken with the drawings in which Fig. 1 is a schematic showing of the invention applied to a time-temperature controlled system of the pressure fluid operated type; Fig. 2 is a detail of construction showing the mounting of the cam follower of Fig. 1; Fig. 3 illustrates a side elevation of a unit which can be incorporated in the time cycle device to modify the operation of the system of Fig. 1; and Fig. 4 is a schematic showing of a modified form of the invention also applied to a time-temperature controlled system wherein the various parts are electrically operated.

The invention is herein illustrated as applied to a system in which it is desired to control temperature according to a predetermined schedule, although it is also applicable to time-schedule systems for controlling pressure, rate of flow and like conditions. In the upper left-hand corner of Fig. 1 there is illustrated a pipe 5 through which a temperature controlling medium such as steam, hot water or even refrigerated brine is conducted to a region or chamber (not shown), the temperature of which is to be controlled. The flow of this medium through the pipe 5 is effected under the control of a diaphragm type of motor valve generally designated 6, the operation of which is governed by a regulating instrument R of any well-known construction in which the "control temperature" or "set point" is adjustable. As herein illustrated, the regulating instrument is provided with a thermosensitive tube system comprising a Bourdon spring 7 communicating through a capillary tube 8 with a bulb 9 located in the mentioned chamber or region, the temperature of which is to be controlled. It will be understood that the tube system is filled with any well-known thermosensitive filling medium. One end of this Bourdon spring is fixed to the frame of the instrument (not shown) while the other end thereof which is free, is connected by a link 10 to an intermediate point on the pen arm 11. This pen arm is pivotally mounted at 12 by means of a suitable bracket 13 and is provided at its lower end, as illustrated, with a stylus 14 in operative relation to a graduated chart 15 which is attached to the arbor 16 of a suitable clock mechanism 17. The upper end of the pen arm is connected by a link 18 to a baffle-actuating lever 19 pivoted at 20 on a suitable bracket 21 carried by the instrument frame. There is also mounted on the pivot 20 an arm 22 on which there is pivotally supported a baffle 23, the lower end of which baffle tends to swing counterclockwise under the influence of a counterweight 24 toward a fixed nozzle 25. The lever 19 which is partially broken away to show the baffle 23 more clearly carries a pin 26 projecting in a position to engage the upper end of the baffle 23. By this arrangement when the lever 19 swings clockwise the projecting pin 26 thereon also swings the baffle 23 clockwise so that its lower end recedes from the nozzle 25. Pressure fluid, such as compressed air, is supplied to the nozzle 25 through the conduit 27 which, in turn, is connected through the construction 28 to the pressure fluid supply conduit 29. It will be noted that conduit 27, the pressure in which is controlled by the relative position of the baffle and the nozzle 25, terminates in a capsular chamber or bellows 58 which actuates the ball valve in the conduit 59 leading to the motor diaphragm top 60 of the valve 6. The pivoted arm 22, which carries the pivoted baffle 23, is connected by a link 30 to a time cycle device. The mechanism thus far described may be of any conventional type and the specific arrangement herein shown is merely for purposes of description.

In order to change the controlled temperature value or the set point of the instrument R, it is necessary to move the link 30 to the right or to the left. In the past, this has been accomplished by a pivoted cam follower arm which arm has been actuated from a cam similar to 31, the cam being rotated in accordance with the passage of time, preferably by means of suitable clock mechanism such as 32. It has been found, however, that in prior instruments the slope of the surface such as 31a of the cam had to be gradual or else the roller on the cam follower arm would bind and would not ride up on this surface. Consequently there was a definite minimum temperature change period beyond which a further time reduction could not be made.

In accordance with the present invention the slope of the surface 31a may be abrupt; in fact, it may be defined by an arc drawn about the pivot 34 as a center and yet there is no danger of the cam follower 38 binding because of the abruptness of the rise of the cam surface. In the present arrangement the link 30 is connected to the follower arm bracket 33, pivoted at 34 in a suitable support, which bracket functions as a bell crank lever, of which one arm is indicated at 35 and a second arm is indicated at 36. The follower arm 37 comprises the two spaced strips 37a and 37b joined at their left-hand ends by a pin on which there is mounted a follower or roller 38 and joined at their right-hand ends by spacers 39 and 40. This follower arm is mounted for rotary movement with the bracket 33 and to move longitudinally with respect to the arm 36 of this bracket, the strips 37a and 37b thereof being provided at their right-hand ends with slots 41 so that the follower arm can move outward slightly until limited by the pivot 34 of the bracket. The lower arm 37b has a slot 42 therein, through which a pin 43 on the bracket arm 36 projects, while a tension spring 44 connects the spacer 40 to the pin 43 so that the arms 37a and 37b are normally drawn toward the right against the pivot 34. A coil spring 45 tends to rotate the follower arm in a counterclockwise direction. The bracket 33 is also provided with an arm or lug 46 extending in the path of a post 47 which is mounted on the movable plate 48 of a pressure-actuated bellows 50 provided with a housing 49. The interior of this bellows is connected by a conduit 51 to a nozzle 52 which is mounted on the fixed nozzle block 53. A branch conduit 54 leading from the nozzle 52 and including the constriction 55 communicates with the air supply conduit 29. A flexible baffle 56 is mounted on the nozzle block in such a way that it tends to approach the nozzle 52 but it is normally limited from so doing by its engagement with the adjacent end of the follower arm 37.

It will be understood that if it is desired to raise the temperature of the chamber in which the bulb 9 is located in a very short interval of time, the timing cam 31 will have its edge or cam surface 31a cut to measure the proper time interval. As the cam is rotated in the direction indicated by the arrow, the surface 31a thereof will engage the roller 38 on the cam follower 37 tending to pull the follower including the arms 37a and 37b away from the pivot 34. This movement of the arms 37a and 37b permits the resilient baffle 56, to follow in the same direction and therefore approach the nozzle 52. This approach of the baffle toward the nozzle causes the pressure of the fluid in the conduit 51 to build up and consequently the bellows 49 will expand and its movable plate 48 moves the post 47 outward into engagement with the arm 46 on bracket 34 which causes this bracket and its follower arm 37 to move clockwise a small increment against the tension of the spring 45. This movement of the follower, through the link 30, moves the baffle support lever 22 clockwise so that the set point or the control point of the instrument is slightly raised. The mentioned swinging movement of the follower arm 37, of course, is very limited but it is sufficient so that follower 38 permits this arm to move toward the right and thereby move baffle 56 away from the nozzle 52. As a result of the separation of the baffle and the nozzle, the pressure in the bellows 49 is reduced and it ceases to rotate follower arm 37. However, the cam disc 31 continues to rotate under the action of the clock 32 so that the surface 31a of the cam will again pull the follower arm 37 outward from the pin 34, again permitting the baffle 56 to approach the nozzle 52 with the result that the pressure in the bellows 49 will cause it to expand. The expansion of this bellows causes the post 47 to engage the arm 46 on the bracket, thereby further rotating the follower arm by a small increment of movement. As a result of a series of such small rotary movements or steps of the follower arm the follower thereon is moved upward along the abrupt surface of the cam without binding, to effect the desired change in the set point of the instrument R.

It has been mentioned that the cam follower 37 is rotated by small increments or steps and in certain applications it is desired that the movement of the follower arm be more uniform, that is, substantially without the stepped motion. In order to effect this result, the time cycle device may be modified by having incorporated therein a damping unit between the bellows 49 and the arm or lug 46 on the follower arm bracket 33. This damping unit, as illustrated in Fig. 3, may be in the form of a lever 62 pivoted at 63 in a fixed part of a frame 64. The free end of this lever is mounted between the post 47 of the bellows and the lug 46 of the follower arm bracket. The movement of this lever in either direction is retarded by a pair of bellows 65 and 66 having their remote ends attached to a part of the frame 64 and having their adjacent ends engaging the top and bottom sides of the lever 62. These bellows, which are filled with a liquid, communicate with each other through a capillary tube 67. By this arrangement any upward movement of the lever 64 tends to force the liquid from the bellows 66 through a capillary tube 67 to the bellows 65, thereby retarding the action of the lever 62, while a downward movement of lever 63 tends to force liquid from the bellows 65 through tube 63 to bellows 66 with the resultant retarding action. It will be understood that the amount of the damping exerted by the bellows 65 and 66 may be varied by varying their position along the lever 62 with respect to its pivot 63.

The smoothing out of the stepped rise of the follower arm as accomplished in the arrangement of Fig. 3, can also be effected in the construction of Figs. 1 and 2 by making the lug 46 of greater length and by adjustably mounting bellows 50 together with its housing so that the distance, between the pivot 34 and the point of contact of post 47 with the lug 46, can be lengthened.

In the modified form of the invention shown in Fig. 4, a modified time cycle device is incorporated in an electrically operated system, as distinguished from the pressure fluid or air-operated system of Figs. 1, 2, and 3. In this modification, identical parts are designated by the same reference characters as in the first-mentioned form.

As in the foregoing arrangement, a clock 32 rotates the timing cam 31 having the abrupt edge or cam surface 31a. Likewise the follower arm 37 is provided with a follower 38 bearing on the edge of the cam. This follower arm likewise includes the spaced strips 37a and 37b which are adapted to rotate about the pivot 41 and to move radially with respect thereto. The tension spring 44, as in the foregoing arrangement, tends to hold the follower arm in the position shown, in engagement with the pivot 41, while a second tension spring 45 tends to swing the follower arm in counterclockwise direction. A lever 65 is secured at its intermediate portion to the pivot or arbor 41 and this lever terminates at its lower end in a sector 66 provided with gear teeth which engage a pinion 67 driven through suitable reduction gearing, not shown, by the motor 68. The upper end of the lever 65 is connected by a link 69 to a movable table 70 of an electrically operated controller, which table is pivotally mounted at 90. This table carries spaced contacts 71 and 72 between which a contactor 73 is movable. The lower end of this contactor is connected to the movable portion of a Bourdon spring 7 which with thermosensitive bulb 9 connected together by the capillary tube 8, constitutes a well-known form of tube system. The tube system is filled with a thermosensitive medium responsive to temperature changes in the chamber in which the bulb 9 is located. This controller together with the time cycle device functions to control the adjustment of the valve 75 in the pipe 76 which conducts regulating medium such as hot water, steam or even refrigerated brine to the chamber, the temperature of which is to be controlled. The valve 76 as herein illustrated, is of the electrically operated type and its valve stem 77 is operated by the link 78 and the crank 79 which is rotatable by the shaft of a motor of which only the field winding 80 is illustrated. This shaft has secured thereto a cam 81 which controls the movable spring contacts 82a and 82b. It should be mentioned that the motor rotates in one direction only, but the rotation of the crank 79 through its link connection 78 to the valve stem 77 serves alternately to open and close the valve.

In the operation of this modified system, clock 32 rotates cam 31 counterclockwise and since the cam surface 31a is rather abrupt, the cam follower 38 moves the follower arm 37 outward radially from the pivot 41. The resilient contact spring 83 which normally engages the upper end of the follower arm 37 is thereby permitted to move into engagement with the fixed contact spring 84. The engagement of these springs completes a circuit from one side of the alternating current source, conductors 85, 86, winding of the motor 68, conductor 87, contact springs 84 and 83, conductors 88 and 89, to the other side of the alternating current source. As a result of the closure of this circuit, the motor 68 rotates its pinion 67 and this pinion, in turn, rotates the lever 65 to rotate the follower arm 37 by a small increment of movement. As a result of the rotary movement of the arm 37, this arm is permitted to approach the pivot 41 so that the spring 83 is temporarily moved out of engagement with the fixed spring 84. However, as the cam 31 continues to rotate, the follower arm 37 will be moved outward again from the pivot 41 so that the contact spring 83 again engages the contact spring 84 with the result that the motor 68 is again operated and the follower arm 37 is moved a small increment in a rotary direction. A repetition of these several operations takes place until the follower 88 has moved up the abrupt edge 31a of the cam and is in engagement with the circular portion 31b thereof.

It will be appreciated that as the sector 66 swings the lever 65 in a clockwise direction, the link 69 moves the table 70 so that in effect the set point or the control temperature of the regulator is raised, that is, the fixed contacts 71 and 72 are moved toward the right. Thus, while the temperature about the bulb 9 is below that indicated by the time-temperature cam 31, the contact 71 will be moved into engagement with the contactor 73. On the closure of the contacts 71 and 73 a circuit is completed from one side of the alternating current source, conductors 85 and 90, contacts 73 and 71, contact spring 91 now in engagement with the movable contact spring 82a, field winding 80 of the motor, conductor 89, to the other side of the alternating current source. The motor thus operates and through the crank 79 and link 78 elevates the valve stem 77, to open the valve in the pipe 76. It will be understood that the motor continues to operate as long as the last described circuit is closed.

I claim:

1. In a time cycle device, a rotatable cam having an abrupt cam surface, means for rotating said cam, a follower arm provided with means to engage the surface of said cam, said arm being mounted for rotary and radial movement with respect to a given axis, and means responsive to radial movement of said follower arm for rotating the same about said axis.

2. In a time cycle device, a rotatable cam having an abrupt cam surface, means for rotating said cam, a follower arm provided with means to engage the surface of said cam, said arm being mounted for rotary and radial movement with respect to a given axis, means responsive to radial movement of said follower arm for rotating the same about said axis, and damping means for delaying said rotary movement.

3. In a time cycle device, a rotatable cam having an abrupt cam surface, a follower arm provided with means to engage the surface of said cam, a rotatable bracket on which said arm is mounted for radial movement with respect thereto, a bellows provided with a post movable thereby, a lug on said bracket projecting into the path of said post, a source of compressed fluid connected to said bellows, and means responsive to the radial movement of said arm for controlling the application of said fluid to said bellows.

4. In a time cycle device, a rotatable cam having an abrupt cam surface, a follower arm provided with means to engage the surface of said cam, a rotatable bracket on which said arm is mounted for radial movement with respect thereto, a bellows provided with a post movable thereby, a lug on said bracket projecting into the path of said post, a source of compressed fluid connected to said bellows, means responsive to radial movement of said arm for controlling the application of said fluid to said bellows, and fluid damped means interposed between said post and said lug.

5. In a time cycle device, a rotatable cam having an abrupt cam surface, a follower arm provided with means to engage the surface of said cam, a rotatable bracket on which said arm is mounted for radial movement with respect thereto, a bellows provided with a post movable thereby, a lug on said bracket projecting into the path of said post, a source of compressed fluid connected to said bellows, means responsive to the radial movement of said arm for controlling the application of said fluid to said bellows, a pivoted lever having its free end interposed between said pivot and said lug, a pair of bellows having their remote faces stationary and their adjacent movable faces engaging the opposite sides of said lever, a capillary tube communicating with the interior of said pair of bellows, and damping liquid in said bellows and tube.

6. In a time cycle device, a rotatable cam having an abrupt cam surface, a follower arm provided with means to engage the surface of said cam, a rotatable bracket on which said arm is mounted for radial movement with respect thereto, a nozzle, a baffle movable with respect to said nozzle under the control of the radial movement of said arm, a bellows provided with a part movable thereby to effect rotation of said bracket, and a conduit connectible to a source of pressure fluid and communicating through a constriction with said bellows and said nozzle.

7. In a time cycle device, a rotatable cam having an abrupt cam surface, a follower arm provided with means to engage the surface of said cam, an arbor on which said arm is mounted for longitudinal movement, electrical means for rotating said arbor and the follower arm mounted thereon, electrical contacts controlled in response to longitudinal movement of said arm, and a circuit for said electrical means completed at said contacts.

8. In a device of the class described, a rotatable cam, means for rotating said cam, a follower engaging the surface of said cam, said follower being mounted for movement in a rotary path and being mounted for movement in a secondary direction away from said rotary path, operating means for rotating said follower in said rotary path, and means responsive to the movement of said follower in said secondary direction for causing said operating means to rotate said follower in its rotary path.

9. In a device of the class described, a rotatable cam having an arcuate cam surface, means for rotating said cam, a follower engaging the surface of said cam, said follower being mounted for movement in an arcuate path and being mounted for movement in a secondary direction away from said arcuate path, and means including an electric motor responsive to the movement of said follower in said secondary direction for moving the follower in said arcuate path.

EDWARD B. FOOTE.